March 19, 1940.   F. H. HEHEMANN   2,193,922
VALVE AND FLEXIBLE GATE
Filed Nov. 15, 1937   4 Sheets-Sheet 1

INVENTOR
FREDERICK H. HEHEMANN
BY
Toulmin & Toulmin
ATTORNEYS

March 19, 1940.  F. H. HEHEMANN  2,193,922
VALVE AND FLEXIBLE GATE
Filed Nov. 15, 1937  4 Sheets-Sheet 2
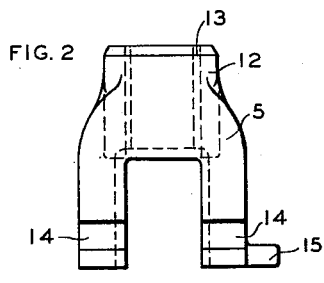
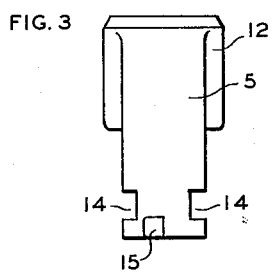
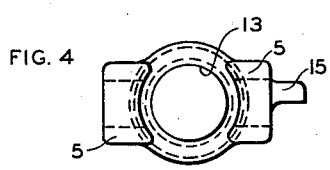
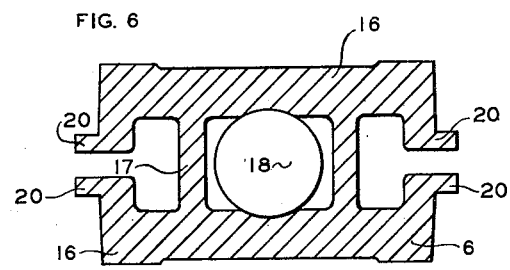
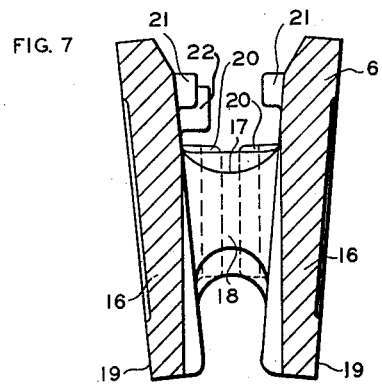
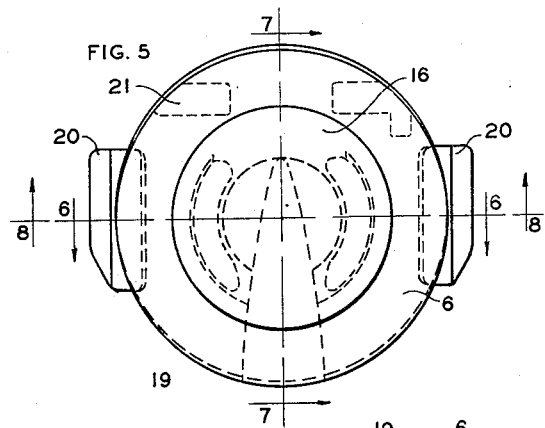
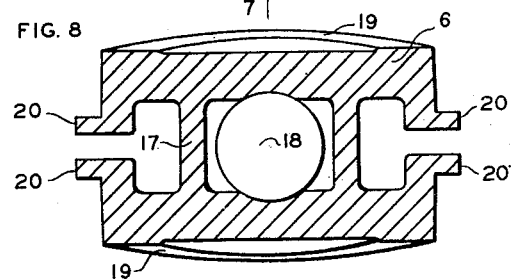
*INVENTOR*
FREDERICK H. HEHEMANN
BY Toulmin & Toulmin
*ATTORNEYS*

March 19, 1940.  F. H. HEHEMANN  2,193,922
VALVE AND FLEXIBLE GATE
Filed Nov. 15, 1937  4 Sheets-Sheet 3
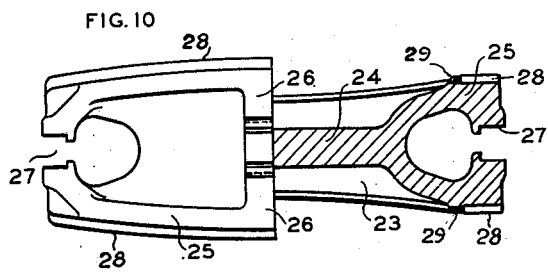
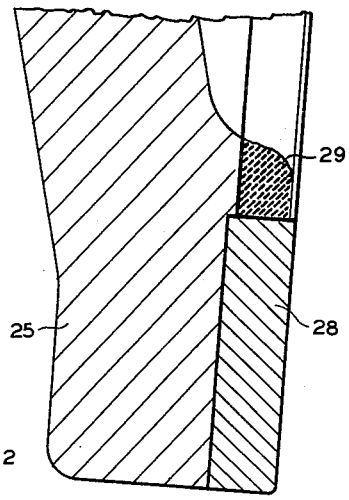
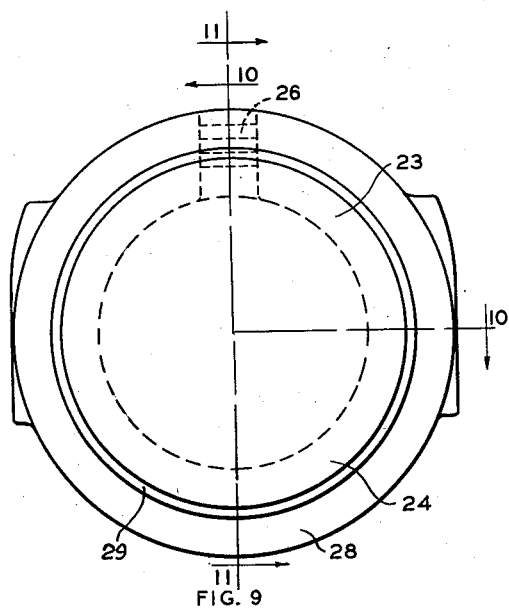
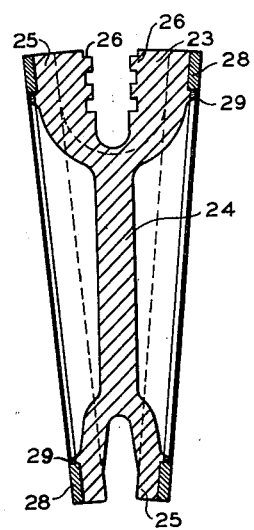
INVENTOR
FREDERICK H. HEHEMANN
BY Toulmin & Toulmin
ATTORNEYS March 19, 1940. F. H. HEHEMANN 2,193,922
VALVE AND FLEXIBLE GATE
Filed Nov. 15, 1937 4 Sheets-Sheet 4
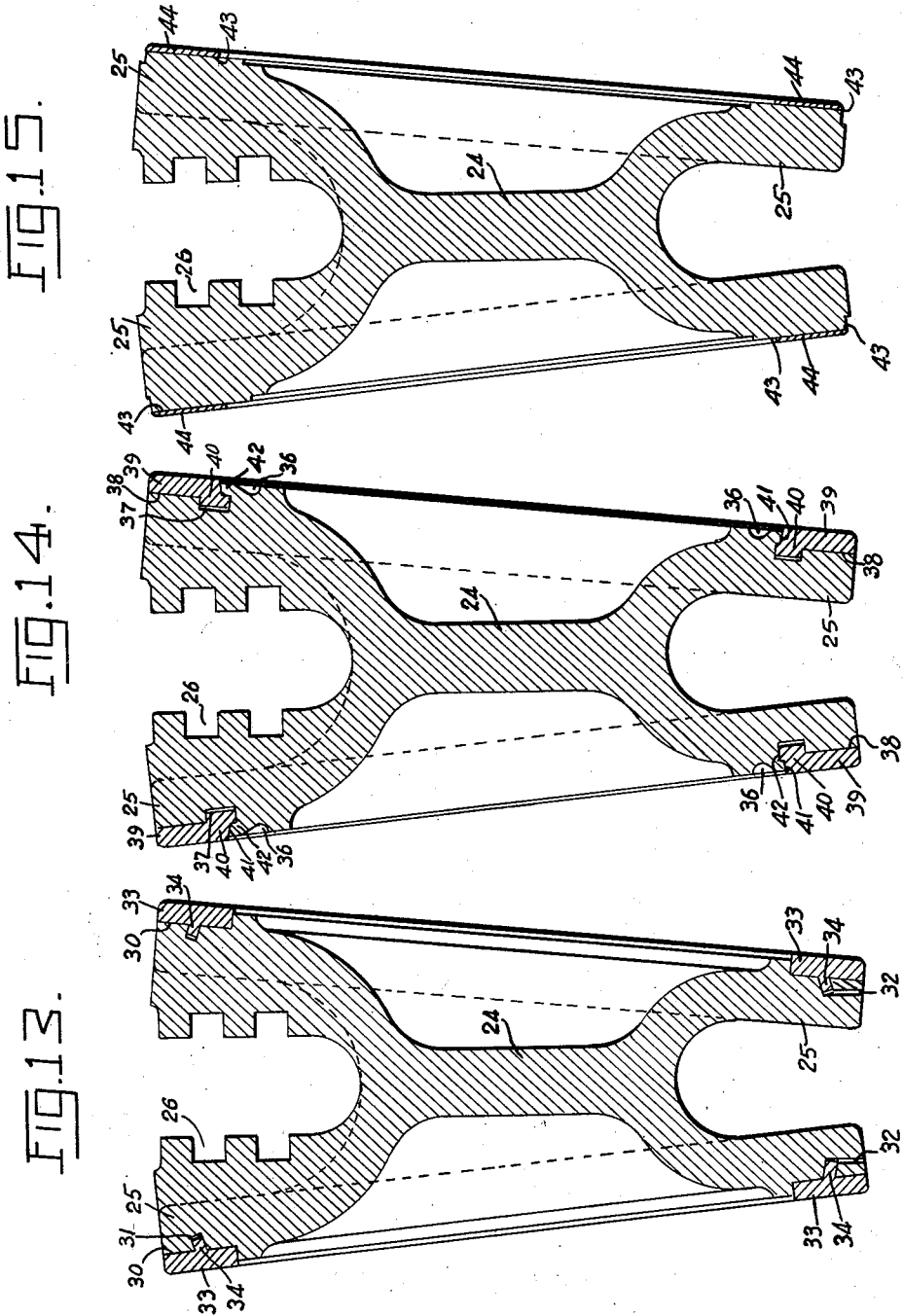
Inventor
FREDERICK H. HEHEMANN,
BY Toulmin & Toulmin
Attorneys Patented Mar. 19, 1940

2,193,922

UNITED STATES PATENT OFFICE 2,193,922

VALVE AND FLEXIBLE GATE

Frederick H. Hehemann, Cincinnati, Ohio, assignor to The Lunkenheimer Company, Cincinnati, Ohio, a corporation of Ohio Application November 15, 1937, Serial No. 174,541

2 Claims. (Cl. 251—62)

This invention relates to valves, in particular, to gate valves.

It is an object of this invention to provide, for use in such a valve, a resilient or yieldable valve gate construction particularly adapted for use in a wide range of service conditions.

It is a further object of this invention to provide a valve gate construction which is particularly adapted to compensate for elastic deformations of the valve body and its seats, incident to internal fluid pressure.

It is a further object of this invention to provide a valve gate construction having sufficient resiliency to compensate for the unavoidable elastic and plastic or "creep" deformations of the body and its seats incident to high pressures and high temperatures, thus insuring tight closure of the valve.

It is a further object of this invention to provide such a gate valve construction wherein the inherent resiliency of the valve gate will prevent "sticking" or "freezing" of the valve gate between the body seats, regardless of the effects of differential expansion or contraction of the several parts of the valve, during heating or cooling of the valve.

It is a further object of this invention to provide such a valve gate construction, wherein the valve facings are constructed or formed of hard materials having a high degree of resistance to wear, erosion and corrosion.

These and other objects and advantages will appear from the following description taken in connection with the drawings.

In the drawings:

Figure 2 is a view, in side elevation, of connector means adapted to be removably connected to the valve gate and screw-threadedly connected to the valve stem;

Figure 3 is an end elevational view of the structure shown in Figure 2;

Figure 4 is a top plan view of the structure shown in Figures 2 and 3;

Figure 5 is a side elevational view of one form of valve gate constructed according to the principles of this invention;

Figure 6 is a section taken on the line 6—6 of Figure 5;

Figure 7 is a section taken on the line 7—7 of Figure 5;

Figure 8 is a section taken on the line 8—8 of Figure 5;

Figure 9 is a side elevational view of a modified form of valve gate constructed according to the principles of this invention, particularly adapted for an outside screw and yoke gate valve;

Figure 10 is a top plan view, partly in section, of the valve gate illustrated in Figure 9;

Figure 11 is a section taken on the line 11—11 of Figure 9;

Figure 12 is an enlarged fragmentary view illustrating the manner in which the facing is secured to the valve body illustrated in Figure 11;

Figure 13 is a section, similar to Figure 11, but illustrative of the mechanical attachment of valve facing rings to the valve gate body;

Figure 14 is a view similar to Figure 13, but showing a modification of the structure illustrated therein;

Figure 15 is a section, similar to Fig. 11, but illustrative of the method of applying stellite seat facings to the valve gate body.

Figure 1:
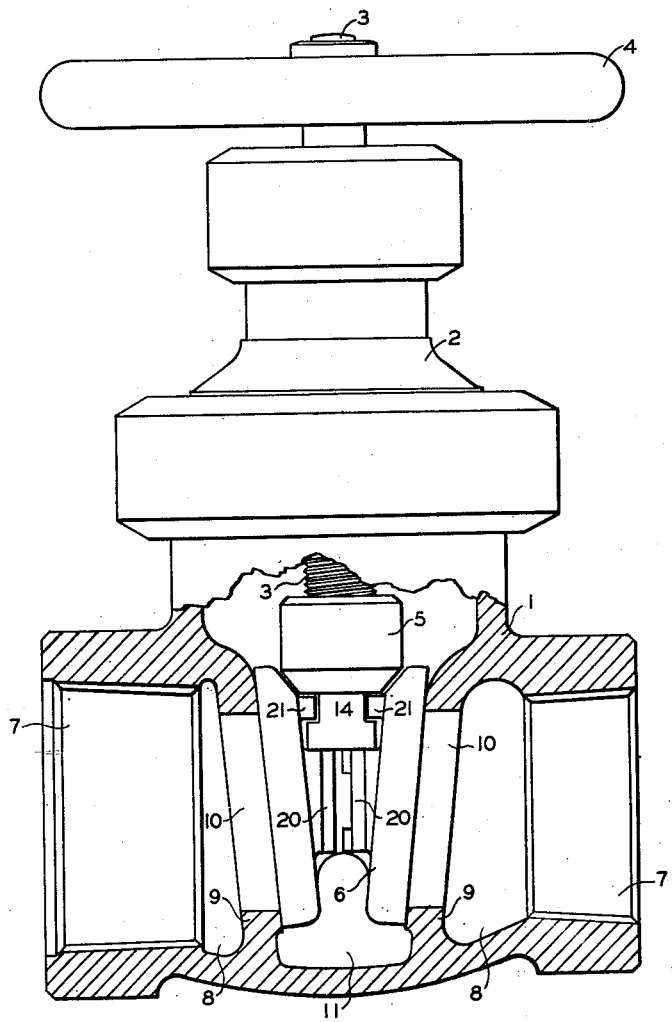
Figure 1 is an elevational view, partly in section, of a non-rising-stem gate valve equipped with a valve gate constructed according to the principles of this invention.

Referring to the drawings in detail and with reference particularly to Figure 1, the valve casing 1 has the bonnet 2 rigidly secured thereto in suitable manner, which bonnet rotatably supports the valve stem 3. The valve stem 3 is provided at its upper end with rigidly secured hand wheel means 4 and, at its lower end with suitable screw threads adapted to screw-threadedly engage the connector member 5, which is removably attached to the valve gate generally designated 6.

The valve casing 1 is provided with suitable connector means 7 at opposite ends, which may, if desired, be provided with screw threads for screw-threaded attachment of conduits thereto, or the ends of suitable conduits may extend into the connector means 7 and be secured to the valve casing by means of welding.

Adjacent each connector 7 is a chamber 8 which terminates at its opposite end in an inclined web 9 having a port 10 extending therethrough. The spaced webs 9 form an intermediate or central chamber 11, in which the valve gate 6 is movably supported. The side surfaces of the valve gate 6 are inclined at approximately the same angle as the valve seats formed on the inner sides of the webs 9 adjacent and surrounding the ports 10 therein; and, when it is desired to open the valve, in order to provide communication between the chambers 8 therein, the hand wheel 4 is engaged to rotate the stem 3 which, by its screw-threaded engagement with the connector member 5, causes this member and the gate 6, to which it is removably attached, to be drawn upwardly in the central or intermediate chamber 11 to provide communication through ports 10 between the chambers 8 of the valve and any pipes or conduits secured thereto.

The details of the connector member 5 are shown in Figures 2, 3 and 4, wherein it will be seen that this member comprises an upper cylindrical portion 12 provided with screw threads 13 adapted to engage screw threads on the valve stem 3. Extending downwardly from the cylindrical portion 12 is a bifurcated portion having each furcation thereof provided at opposite sides with transverse grooves or channels 14. These grooves or channels 14 are adapted to cooperate with suitable means provided on the valve gate 6 to permit of ease of attachment together of these parts and ease of removal therefrom.

One of the furcations is also provided with a projection 15 extending outwardly from one side thereof, which is adapted to cooperate with a suitable abutment 22 provided on the valve gate 6.

The valve gate 6 illustrated in Figures 5, 6, 7 and 8 is formed into a unitary body comprising a pair of plate members 16 having an integral boss 17 therebetween, which is provided with a central vertical bore 18 for receiving the lower, screw-threaded, end of the valve stem 3. The boss forms a substantially resilient support for the "bendable" plate members 16. The plate members 16 are inclined in such manner that, when the valve gate is seated, the annular faces 19 are disposed in parallelism with the faces of the valve seats on the webs 9 of the valve, with which faces they closely engage to prevent leakage.

An integral guide flange 20 is formed at each side of each plate member 16, and the pairs of guide flanges 20 at each side of the valve gate 6 are spaced as shown in Figures 6 and 8. These guide flanges 20 are adapted to be slidably disposed in guide channels formed in the sides of the central chamber 11 of the valve casing 1 in order to provide vertical guiding means for the valve gate.

Above the boss 17, each plate or disk member 16 is provided with a pair of laterally spaced inwardly directed projections 21; one of which is provided with a downwardly extending lip 22 which is adapted to have its inner surface engaged by the outer surface of the projection 15 on the connector member 5 when the connector member 5 is properly positioned with respect to the valve gate 6.

In order to position the connector 5 with respect to the valve gate 6, the projections 21 are engaged in the grooves or channels 14 of the connector and the projection 15 on connector 5 is bent over the abutment 22 on the valve gate 6, to prevent the valve gate from accidentally dropping off the connector when assembling or disassembling the valve trimming from the valve body.

The valve gate illustrated in Figures 5 to 8 inclusive may be made of bronze, nickel alloys, stainless steel or other corrosion resistant materials or the body of the valve gate may be made of cast iron or steel and may be provided with facing members or rings of corrosion resistant materials secured by rolling-in the rings, by means of welding, or by depositing suitable facing materials directly by means of a welding torch.

While valve bodies are proportioned to keep the working stresses, incident to internal pressure and to pipe strains, within safe limits, the bodies and their seats deform elastically under these stresses, necessitating a resilient valve gate which is free to deform with the body seats and thus effect tight closure of the valve.

Where the valve gate is subjected to extremely high pressures and temperatures, as in high pressure steam systems, it is preferred to utilize the gate construction illustrated in Figures 9, 10, 11 and 12, wherein the valve gate generally designated 23 is formed of a central web 24 having integrally formed inclined annular flanges 25. The flanges 25 are provided at their upper ends with inwardly extending transversely grooved projections 26 adapted to slidably receive a valve stem in the same manner in which the connector member 5 is received by the valve gate 6 illustrated in Figures 5 to 8 inclusive.

At opposite sides, the valve gate 23 is provided with projections and guide grooves 27 formed between adjacent surfaces of the flanges 25, 25 which grooves 27 are adapted to engage a suitable guide rib provided in the valve casing in which the valve gate 23 is adapted for use.

The valve gate body shown in Figures 9, 10, 11 and 12 comprising web 24 and flanges 25 for high pressure high temperature service is usually made of carbon steel or low alloy steels. The facings 28 are preferably made of stellite which has the desired hardness, wear resistance and corrosion resistance. Where it is desired or required to meet specific service conditions, the facings 28 illustrated in Figures 9 to 12 inclusive may be formed of nickel alloys, stainless steel or other suitable corrosion resistant materials and may be secured rigidly and/or integrally to the flanges 25 by means of welding 29, a rolled-in construction commonly used in commercial practice, or by depositing suitable facing material directly by means of a welding torch. The construction of the valve gate is in the form of a central web 24, resilient radially extending inclined webs and annular flanges 25 and facing members or rings 28 which are adapted to engage the body seats.

In high pressure high temperature service, the valve body and its seats are deformed elastically by the application of internal fluid pressure, and slowly but permanently or plastically by "creep" strains incident to the combined effects of shell stress and high temperature. A resilient yieldable valve gate of the construction described herein will deform to match the body seats and thus effect tight closure of the valve.

With the valve in the closed position, differential contraction of the several parts of a conventional gate valve having a solid rigid valve gate will set up excessively high body shell stresses which will grip the valve gate between the body seats with such force as to render the valve inoperative by ordinary means. A resilient valve gate will yield under similar circumstances, thus avoiding excessive shell stresses and a "jammed" or "sticking" valve.

The use of stainless steel facings is, of course, merely illustrative and it will, of course, be understood that other various materials may be used for forming the valve gate facings or facing rings. In Figures 13 and 14, I have illustrated methods for mechanically securing to a valve gate body facings or facing rings of bronze, nickel-copper alloys, nitralloy and stainless iron.

In the structure of Figure 13 the flanges 25 of the valve gate body are provided with annular peripheral stepped portions 30 from which extend inwardly into the body of the flanges 25, (at an acute angle with respect to the annular peripheral stepped portions 30) the annular grooves or recesses 31. The flanges 25 are provided with radially disposed inwardly extending bores 32 which are placed therein before the facings or facing rings are applied to the valve gate body. The facing rings 33 shown in Figure 13 are formed of bronze and are substantially annular and provided with inwardly extending flange portions 34, which are adapted to be received in the grooves or recesses 31, as shown in Figure 13.

The annular peripheral grooves or stepped portions 30 and the grooves or recesses 31 are first formed on the valve gate body and the bores 32 are placed in the valve gate body and thereafter the bronze facings or facing rings 33 are pressed thereon. The angularity of the grooves or recesses 31 and the flange portions 34 securely locks the disc facing rings 33 to the valve gate body, and produces a pressure tight joint.

In Figure 14 I have illustrated a method for mechanically securing facings or facing rings of nickel bronze, nitralloy, stainless iron and the like to the flanges 25 of the valve gate body. As shown in this figure, the flange portions 25 of the valve gate body are provided with a plurality of grooves, the inner one being designated 36 and the intermediate or deepest groove being designated 37, while the outer groove or stepped portion is designated 38.

The facing ring is designated 39 and is substantially annular and provided with an undercut annular projection or undercut tongue 40 having an annular inclined surface 41. The tongues disposed between the respective inner grooves 36 and the intermediate grooves 37 are designated 42.

The facing rings 39 are pressed on the valve gate body with the undercut projections or tongues 40 thereof disposed in the intermediate grooves or recesses 37, and thereafter the tongue 42 is rolled over against the inclined surface 41 of the facing ring 39. This rigidly secures the facing rings 39 and produces a pressure tight joint.

Another construction may be utilized where stellite facing rings are used. In that construction, the valve gate body is machined to provide an annular surface 43 as shown in Figure 15, and the stellite 44 is deposited thereon from stellite rods by means of a suitable gas welding torch. The stellite faces are then suitably finished to a thickness of between $\frac{1}{16}''$ to $\frac{3}{32}''$.

It will be understood that the above-described structure is merely illustrative of the manner in which the principles of my invention may be utilized and that I desire to comprehend within my invention such modifications as come within the scope of the claims and the invention.

Having thus fully described my invention, what I claim as new and desire to secure by Letters Patent is:

1. A gate valve comprising a valve casing provided with valve seats, a valve stem threaded at its lower portion, a valve gate comprising an integral one-piece body including a pair of oppositely inclined plate members with an integral intermediate boss therebetween, valve seat engaging faces on said plate members, inwardly directed laterally extending projections integral with and located on said valve gate within the confines of and parallel to said valve seat engaging faces, a valve stem connector having its upper portion threadably engaged with the lower portion of said valve stem and having laterally extending parallel channels located at its lower portion which are laterally slidably engaged with the cooperating projections of said valve gate, an extension on one of said projections, and means on said connector with which said extension cooperates to limit relative lateral movement between said valve gate and said connector.

2. A gate valve comprising a valve casing provided with valve seats, a valve stem threaded at its lower portion, a valve gate comprising an integral one-piece body including a pair of oppositely inclined plate members with an intermediate boss therebetween, valve seat engaging faces on said plate members, inwardly directed externally extending parallel projections integral with and located on said valve gate and parallel to said valve seat engaging faces, a valve stem connector having its upper portion threadably engaged with the lower portion of said valve stem and having laterally extending parallel channels located at its lower portion which are laterally slidably engaged with the cooperating projections of said valve gate, and means to limit relative lateral movement between said valve gate and said connector which comprises an inwardly extending abutment on the valve gate and a laterally extending projection on one side of said connector which projection is bent over said abutment.

FREDERICK H. HEHEMANN.